United States Patent [19]

Igarashi

[11] Patent Number: 4,949,106
[45] Date of Patent: Aug. 14, 1990

[54] MICROFILM SEARCHING AND READING DEVICE

[75] Inventor: Shunkichi Igarashi, Tokyo, Japan

[73] Assignee: Fuji Photo Film Co., Ltd., Kanagawa, Japan

[21] Appl. No.: 324,789

[22] Filed: Mar. 17, 1989

[30] Foreign Application Priority Data

Mar. 18, 1988 [JP] Japan .................................. 63-63488
Aug. 19, 1988 [JP] Japan ................................ 63-204745

[51] Int. Cl.$^5$ ............................................. G03B 23/14
[52] U.S. Cl. ..................................... 353/25; 353/26 A; 353/122; 352/8; 352/123
[58] Field of Search ...................... 353/25, 26 R, 26 A, 353/27 R, 27 A, 122, 103, 111, 112, 105–107, 114; 352/8, 123, 72, 73, 78 R, 78 C

[56] References Cited

U.S. PATENT DOCUMENTS

| 3,164,059 | 1/1965 | Turpentine | 353/26 A |
| 3,480,354 | 11/1969 | Fukuda | 352/123 |
| 3,588,243 | 6/1971 | Osawa et al. | 353/25 |
| 4,025,176 | 5/1977 | Lopata | 353/26 A |
| 4,113,366 | 9/1978 | Grover | 352/123 |
| 4,353,642 | 10/1982 | Weigert | 353/25 |
| 4,755,046 | 7/1988 | Hirose et al. | 353/26 R |

FOREIGN PATENT DOCUMENTS 137141 6/1986 Japan .................. 353/26 A
137142 6/1986 Japan .................. 353/26 A Primary Examiner—William A. Cuchlinski, Jr.
Assistant Examiner—Patrick R. Scanlon
Attorney, Agent, or Firm—Sughrue, Mion, Zinn, Macpeak & Seas

[57] ABSTRACT

A microfilm searching and reading device for selectively taking out a cartridge containing a target image from one or more microfilm cartridge stacks. The device comprises a framework defining at least one storing space extending substantially vertically for storing a stack of cartridges in a manner such that the cartridges are stacked one above another, a scanner for receiving a selected microfilm cartridge and having an image reader and an actuator for winding and rewinding the microfilm, a carrier for taking out the selected cartridge and for guiding the same to the scanner, and a restoring mechanism for putting the selected cartridge, after the target image has been read by the microfilm reader, in the lowermost or uppermost position of the storing space. The device further comprises a memory for storing the location of the restored cartridge, and a controller for controlling the carrier, the scanner and the restoring mechanism. The device of the invention is small in size and capable of searching and taking out a desired microfilm cartridge within a short access time. Also, the device can be readily adapted for change in system scale.

11 Claims, 7 Drawing Sheets

FIG.2
FIG.3
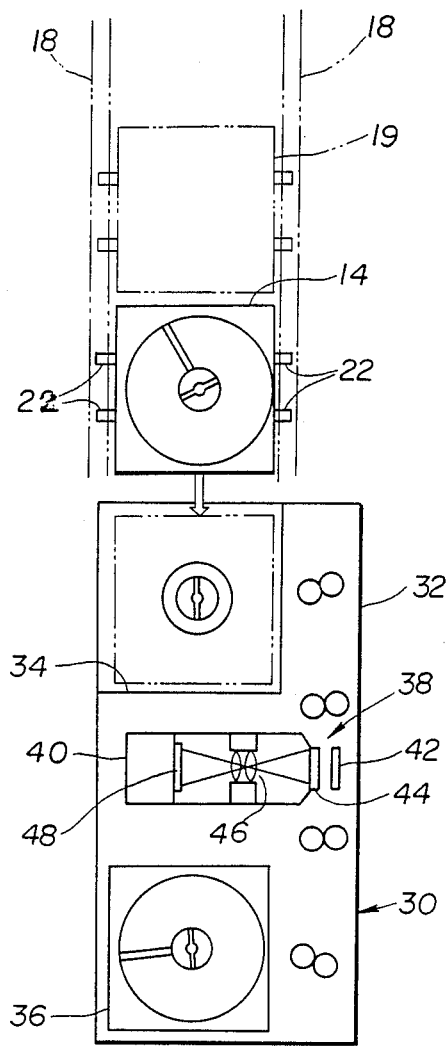
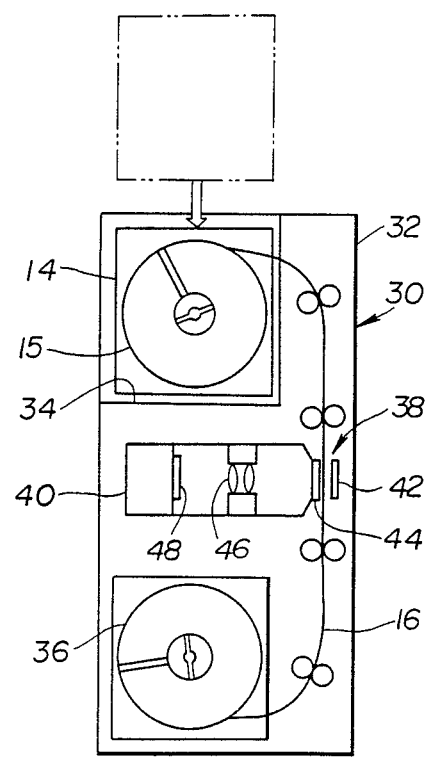

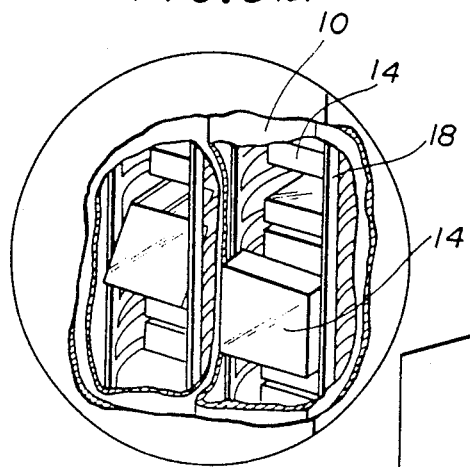
FIG.6(a)
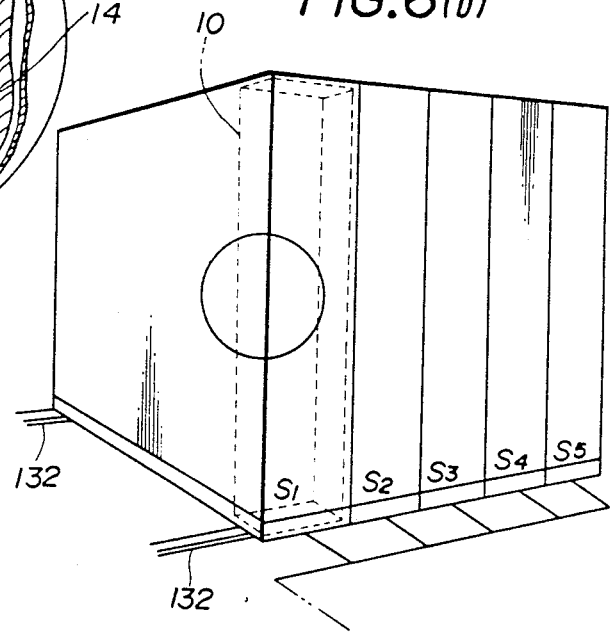
FIG.6(b)
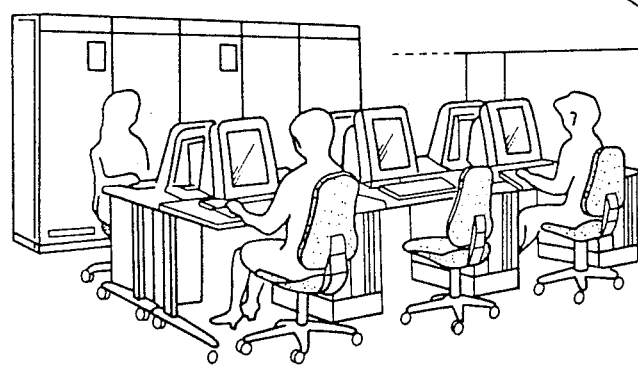

MICROFILM SEARCHING AND READING DEVICE

BACKGROUND OF THE INVENTION:

1. Field of the Invention;

The present invention relates to a microfilm searching and reading device for selectively taking out a cartridge containing a target image from stored microfilm cartridges and then reading out the target image by an image sensor.

2. Prior Art Statement;

There is known an apparatus for selectively taking out a microfilm cartridge containing a target image from a multiplicity of cartridges stored in storing racks and then reading the target image so that image data are converted into digital signals. The output image signals may be supplied to a display device such as a cathode ray tube, a printer or a facsimile, or may be combined with outputs from other data processing units to be printed so that desired data sheets or documents are output. Thus by converting the image data from microfilms into digital signals or data, it becomes possible to realize cooperation of digital image processing devices of different type directly or through a data communication network to improve the utility of the microfilm.

One of the known systems for storing and handling microfilm cartridges is a rotary rack type device, which comprises plural shelves disposed around the periphery of a rotary drum for storing thereon a number of microfilm cartridges, and take-out means arranged at a predetermined location facing to the periphery of the rotary shelves, the take-out means being movable in the vertical direction. In operation of this known rotary rack type device, the drum is rotated so that the rack containing the desired cartridge is faced to the take-out means, and then the take-out means is moved in the vertical direction to take out the desired cartridge which is transferred to an image reader having an image sensor.

However, since the relatively heavy rotary shelves must be rotated in the initial step, and then the take-out means are moved in the vertical direction in the next step, the time costed for taking out the desired cartridge, i.e. the access time, is redundantly long in addition to a large area required for the installation thereof.

Another known system comprises a fixed storing shelf having a configuration similar to a bookshelf, and a carrier arranged in front of the storing shelf to move in a plane facing to and covering all front area of the shelf. In operation, the carrier moves two-dimensionally in the X and Y directions along the vertical plane facing to the front area of the storing shelf to be positioned just before the desired cartridge which is then grasped and taken out by the carrier to be delivered to an image reader disposed at a fixed position. However, this known system has a disadvantage that the access time is prolonged since the cartridge is first taken out from the storing shelf by the carrier and then delivered from the carrier to the image reader. Another disadvantage of this known system is that it requires a large space and it cannot be adapted for a small scale system.

OBJECTS AND SUMMARY OF THE INVENTION:

Accordingly, a primary object of this invention is to provide a microfilm searching and reading device which is small in size and capable of searching and taking out a desired microfilm cartridge within a short access time.

Another object of this invention is to provide such a device which can be readily adapted for change in system scale.

A more specific object of this invention is to provide a microfilm searching and reading device in which microfilm cartridges are stacked one above another in one or more storing spaces so that a desired cartridge is taken out, read by an image reader and then returned to the lowermost or uppermost position of a microfilm cartridge stack while the location of the returned cartridge is stored in a memory.

With the aforementioned objects in view, the present invention provides a microfilm searching and reading device for selectively taking out a cartridge containing a target image from one or more microfilm cartridge stacks, comprising:

- a framework defining at least one storing space extending substantially vertically for storing a stack of cartridges in a manner such that said cartridges are stacked one above another;
- a scanner for receiving a selected microfilm cartridge and having an image reader and an actuator for winding and rewinding the microfilm, the scanner being disposed at a location below tho underside of the lowermost cartridge;
- carrier means for taking out the selected cartridge and for guiding the same to the scanner;
- restoring means for putting the selected cartridge, after the target image has been read by the image reader, in the lowermost, position of the storing space while pushing up the stack of cartridges;
- memory means for storing the location of the restored cartridge; and
- control means for controlling the carrier, said scanner and the restoring means.

According to another aspect of this invention, there is provided a microfilm searching and reading device for selectively taking out a cartridge containing a target image from one or more microfilm cartridge stacks, comprising:

- a framework defining at least one storing space extending substantially vertically for storing a stack of cartridges in a manner such that the cartridges are stacked one above another;
- a scanner for receiving a selected microfilm cartridge and having an image reader and a driving unit for winding and rewinding the microfilm, the scanner being disposed at a location overhanging the one or more microfilm cartridges;
- carrier means for taking out the selected cartridge and for guiding the same to the scanner;
- restoring means for putting the selected cartridge, after the target image has been read by the image reader, in the uppermost position of the storing space;
- memory means for storing the location of the restored cartridge; and
- control means for controlling the carrier means, the scanner and the restoring means.

DESCRIPTION OF THE DRAWINGS:

While the specification concludes with claims particularly pointing out and distinctly claiming the subject matter of the invention, it is believed that the invention will be better understood from the following description of preferred embodiments, taken in conjunction with the accompanying drawings in which:

FIG. 2 is a plan view showing a portion of the carrier means and the scanner which is ready for receiving a microfilm cartridge;

FIG. 3 is a plan view showing the scanner which has received a selected microfilm cartridge;

FIG. 6(a) and (b) are diagrammatical view showing a large scale system in which the device of the present invention is incorporated, wherein FIG. 6(a) is an enlarged section of the circled section of FIG. 6(b);

DESCRIPTION OF PREFERRED EMBODIMENTS:

First Embodiment

The present invention will now be described by referring to a presently preferred embodiment thereof shown in FIGS. 1 to 4 and 6(a) and (b) of the accompanying drawings.

Figure 1:
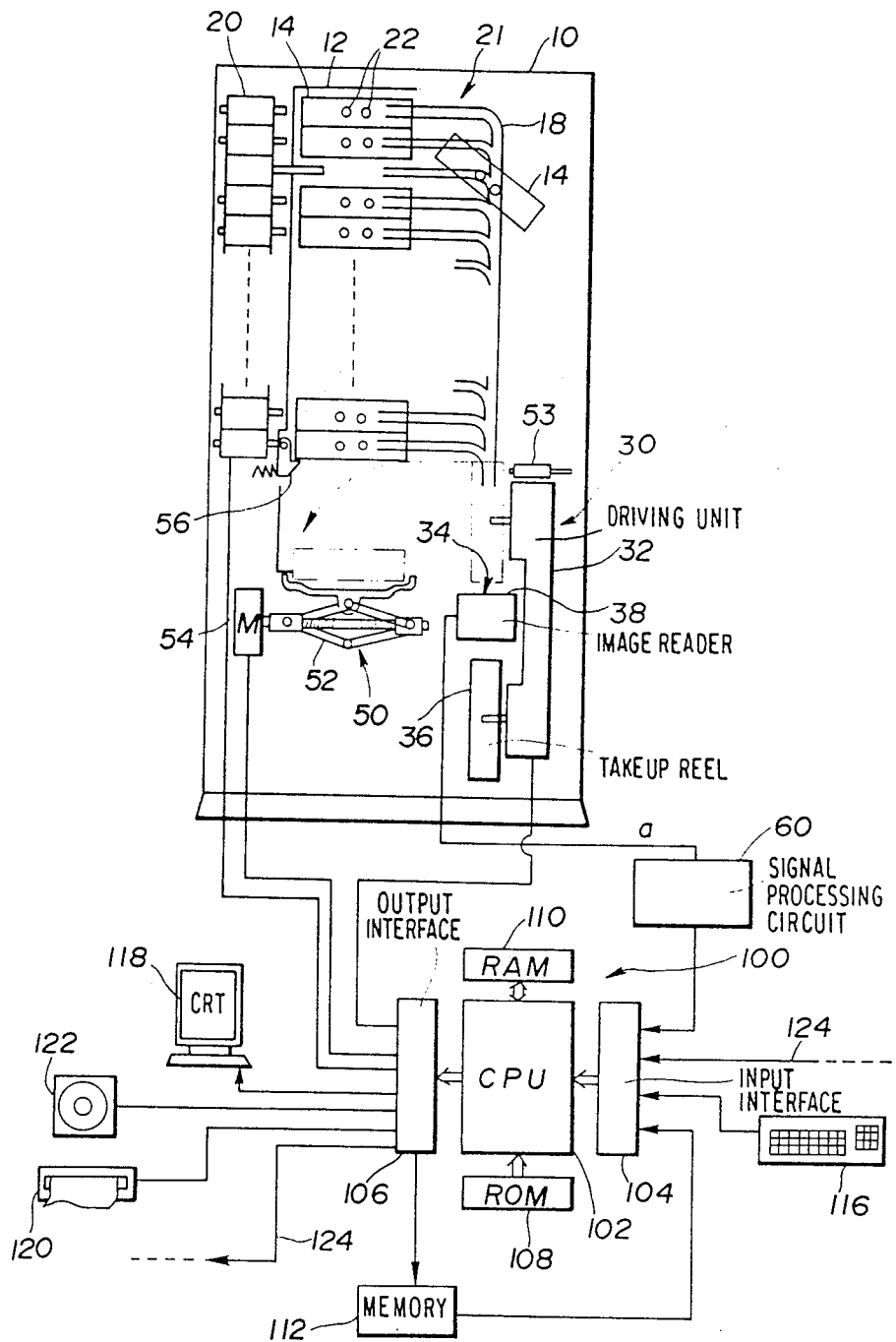
FIG. 1 is a schematic illustration showing a system with which an embodiment of the invention is associated.
Figure 4:
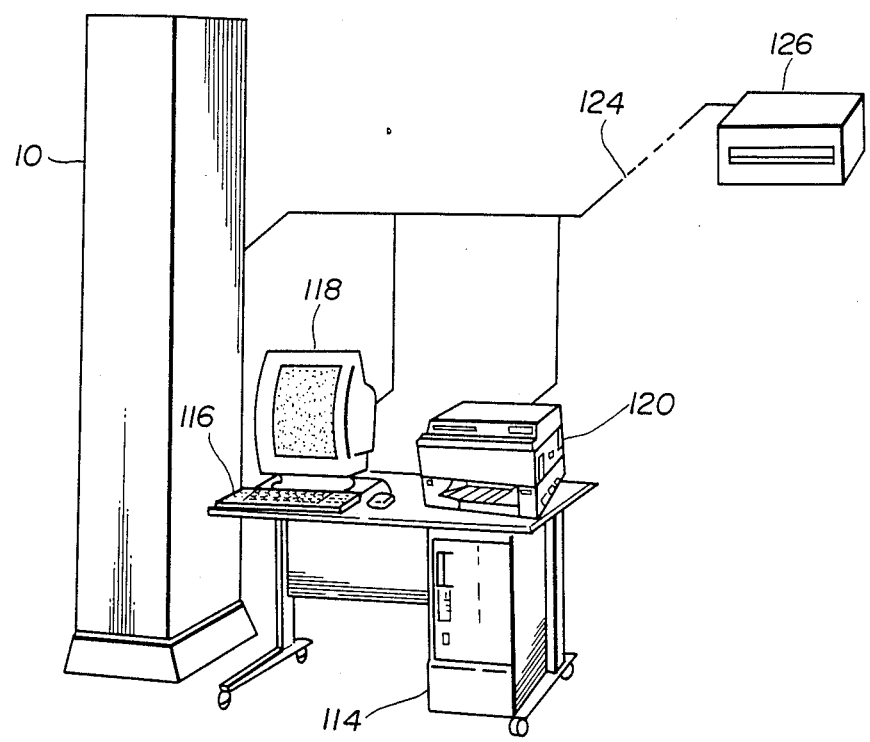
FIG. 4 is a schematic illustration showing a system in which a first embodiment of the invention is incorporated.

Initially referring to FIGS. 1, 4 and 6(a) and (b), a casing has a generally rectangular pillar form and is denoted by reference numeral 10. At one side of the casing 10, a framework 12 is disposed so that a vertically extending space for receiving a stack of microfilm cartridges 14 is defined. In this space, a multiplicity of microfilm cartridges 14 are stored while being stacked one above another. In each microfilm cartridge 14, a reel 15 is contained and a continuous microfilm roll 16 is wound around the reel 15, as best seen in FIG. 3.

The framework 12 comprises paired guide rails 18, 18, and pusher means 20 as means for taking out a selected cartridge from the stack to be received and guided by the guide rails 18, 18. The paired guide rails 18, 18 and the pusher means 20 constitute carrier means 21. Guide pins 22 (see FIGS. 1 and 2) protrude from the sides of each cartridge 14 and are engaged by the guide rails 18, 18 when the cartridge 14 is pushed out in the horizontal direction. The cartridge 14 is then guided by the guide rails 18, 18 to be turned vertically so that it is moved downwards to a scanner 30 which will be described in detail hereinafter. In the illustrated embodiment, the pusher means 20 comprises a group of electromagnetic plungers 20 facing to the backsides of respective microfilm cartridges 14. When it is desired to push out a certain cartridge 14, the electromagnetic plunger 20 facing to the backside of the desired cartridge 14 is energized to push out the cartridge 14 toward the guide rails 18, 18.

In FIGS. 1 to 3, a scanner is generally denoted by reference numeral 30. The scanner 30 is disposed below the terminating ends of the guide rails 18, 18, and comprises a driving unit 32 having a motor for winding and rewinding the microfilm roll 16, a housing which defines a cavity 34 for receiving the cartridge 14 guided by and passed from the guide rails 18, 18, a take-up reel 36, and an image reader 38.

The image reader 38 comprises a sealed reader unit 40 and an EL (electroluminescence) panel 42 which serves as a light source. The EL panel 42 is controlled, for example, by an electromagnetic plunger (not shown) to be pressed on and separated from the microfilm 16. The reader unit 40 includes a glass panel 44 facing to the EL plate 42, a projection lens system 46 sealingly contained in a casing, and an image sensor 48 which is also sealingly contained in the casing. The projection lenses 46 may be moved along the optical axis, by means of a motor and a piezoelectric element, so that the image on the microfilm 16 is precisely focused on the image sensor 48.

Restoring means generally denoted by reference numeral 50 is disposed to restore the cartridge 14 in the cavity 34 to the lowermost position of the framework 12 after the target image in the microfilm roll 16 has been read out. As seen from FIG. 1, the restoring means 50 comprises a pantograph type jack 52, and an electromagnetic plunger 53 for pushing out the cartridge 14 from the cavity 34 of the scanner 30 so that the cartridge 14 is placed on the jack 52. The jack 52 is raised and lowered by a motor 54. When the image reading operation is completed, the cartridge 14 in the cavity 34 of the scanner 30 is pushed by the plunger 53 to be turned horizontally and received by the jack 52, and then raised by the jack 52. As the jack 52 moved upwards, the cartridge 14 is returned to the lowermost position of the stack of cartridges and the stack of cartridges is raised upwards by a distance corresponding to the width or thickness of one cartridge. The cartridge 14 now located at the lowermost position is supported by a stopper 56, as best seen from FIG. 1, so that the guide pins 22 of respective cartridges 14 are aligned with corresponding ends of the guide rails 18, 18.

When a designated cartridge 14 containing a target image is pushed out by the electromagnetic plunger 20, guided by the guide rails 18, 18 and received in the cavity 34 of the scanner 30, the reels 15 and 36 are rotated by the driving unit 32 so that the microfilm roll 16 is wound around the reel 36. The EL plate is separated from the surface of the microfilm roll 16 until the target image frame comes in position. As the target image comes in position, the EL panel 42 presses the microfilm rolls 16 onto the glass plate 44. The EL panel serves as a surface-area light source so that the image on the film 16 is projected through the glass plate 44 and the projection lens system 46 to the image sensor 48. The image sensor 48 scans the image to put out time series image signals a (see FIG. 1). The signals a are binarized by an image signal processing circuit 60 and fed to a control means 100. Although the image sensor 48 is preferably a two-dimensional area sensor, a unidimensional line sensor may be used while being moved in the direction perpendicular to the length direction (i.e. in the subsidiary scanning direction) to read the image.

The control means 100 comprises a small computer, and has a CPU 102, an input interface 104, an output interface 106, a ROM 108 for storing a control program, and a RAM 110 for storing various data necessary for control operations including auto-focusing operation. A memory means 112 is constituted of a memory medium such as an optical disk, a magnetic disk, a magnetic tape or a semiconductor memory medium, and stores the data relating to the addresses of the cartridges stacked in the framework 12. These control means 100 and memory means 112 are contained in a cabinet 114 shown in FIG. 4.

Data relating to the contents and addresses of respective microfilm cartridges 14 are put through a keyboard 116 in the CPU 102 to be stored by the memory means 112. In searching a target image, the code number or other necessary datum is put in the CPU 102 through the keyboard 116. The CPU 102 designates a cartridge 14 containing the target image by referring to the data stored in the memory means 112, and then the pusher means (electromagnetic plunger 20) corresponding to the designated cartridge is actuated so that the designated cartridge 14 is pushed onto the guide rails 18, 18. The pushed cartridge 14 is guided by the guide rails 18, 18 to be moved downwards until it is received in the cavity 34 of the scanner 30. The CPU 102 controls the driving unit 32 so that the reels 15 and 36 are rotated in the scanner 30 until the target image occupies the position between the EL panel 42 and the glass plate 44. Identification of the target image may be effected by sensing a retrieval mark (not shown) attached to each frame of the microfilm roll 16 by an additional photosensor (not shown).

By the instruction from the CPU 102, the EL panel 42 is pressed on the surface of the microfilm 16 and allowed to emit light as the target image comes in situ in front of the glass plate 44. The target image is projected to the image sensor 48. The image signals a from the image sensor 48 are processed by the signal processing circuit 60 to correct the scattering of performance characteristics of photosensitive elements, to correct the shading and to shape the wave-form, and then the processed signals a are binarized to be fed to the CPU 102. When auto-focusing operation is needed, the circuit 60 selects the predetermined space frequency components of the image signals 1 by means of a band pass filter, and the absolute values of the selected components are integrated to determine the contrast signal. In response to the instruction from the CPU 102, the projection lens system 46 is moved to the position at which the contrast signal takes the maximum value. The auto-focusing operation may be carried out by a separate auto-focusing element, for example, auto-focusing may be carried out by a phase difference detecting element.

After the completion of reading the target image, the cartridge 14 is turned in the counter-clockwise direction, as shown by the dot-and-dash line in FIG. 1, to be delivered to the jack 52. In response to the instruction from the CPU 102, the motor 54 is actuated to move the lift 52 upwards. The cartridge 14 placed on the jack 52 is thus restored in the lowermost position of the microfilm cartridge stack contained in the framework 12, while pushing to open the stopper 56, and each of the cartridges 14 in the stack is shifted upwards by the distance equal to the thickness of the cartridge 14. The new addresses of respective cartridges 14 are fed through the CPU 102 to the memory means 112 to be stored in the latter. The entire system is thus in the stand-by condition ready for next operation.

It will be understood that the time spent for each cartridge 14 to move from the stored position to the image reader (scanner 30) is considerably decreased, as compared with the conventional system, since the designated cartridge 14 is guided through the guide rails 18, 18 to the scanner 30 where the target image is read and then the cartridge 14 is restored in the lowermost position of the microfilm cartridge stack contained in the framework 12.

The access time may be further decreased by positioning the next cartridge at a stand-by position 19 along the guide rails 18, 18 as shown by dots-and-dash line in FIG. 2. By the provision of such a stand-by position 19, next cartridge 14 is taken out of the stack in the framework 12 and moved to the stand-by position 19 during the preceding cartridge 14 is processed by the scanner 30, and thus can be transferred in the cavity 34 immediately after the preceding cartridge 14 has been removed from the cavity 34.

The image data read by the image sensor 48 may be fed through the CPU 102 to a variety of image processing devices, such as a cathode ray tube (CRT) 118, a printer 120, an optical disk device 122 or other type external memory means. It is also possible to feed the data through a data communication network 124, such as LAN (local area network), to a facsimile 126 or a CRT settled at a distant place (see FIG. 4). Likewise, by the utilization of the CPU 102, data from external image processing devices may be read through the data communication network 124 so that image data from the external system may be utilized and processed in the device of this invention.

FIG. 4 shows a system of smallest scale in which the embodiment of this invention is incorporated. As shown, the system has one casing 10 combined with a work station. The work station has a keyboard 116, a CRT 118, a printer 120 and a cabinet 114 containing the control means 100 and the memory means 112 (cf. FIG. 1).

Although, in this and following embodiments, only one reel 15 is contained in each microfilm cartridge 14 and thus the scanner must have the winding reel 36, it is unnecessary to provide such winding reel when each cartridge contain two reels one for supplying a film roll or tape and one for taking up the film roll or tape.

Figure 5:
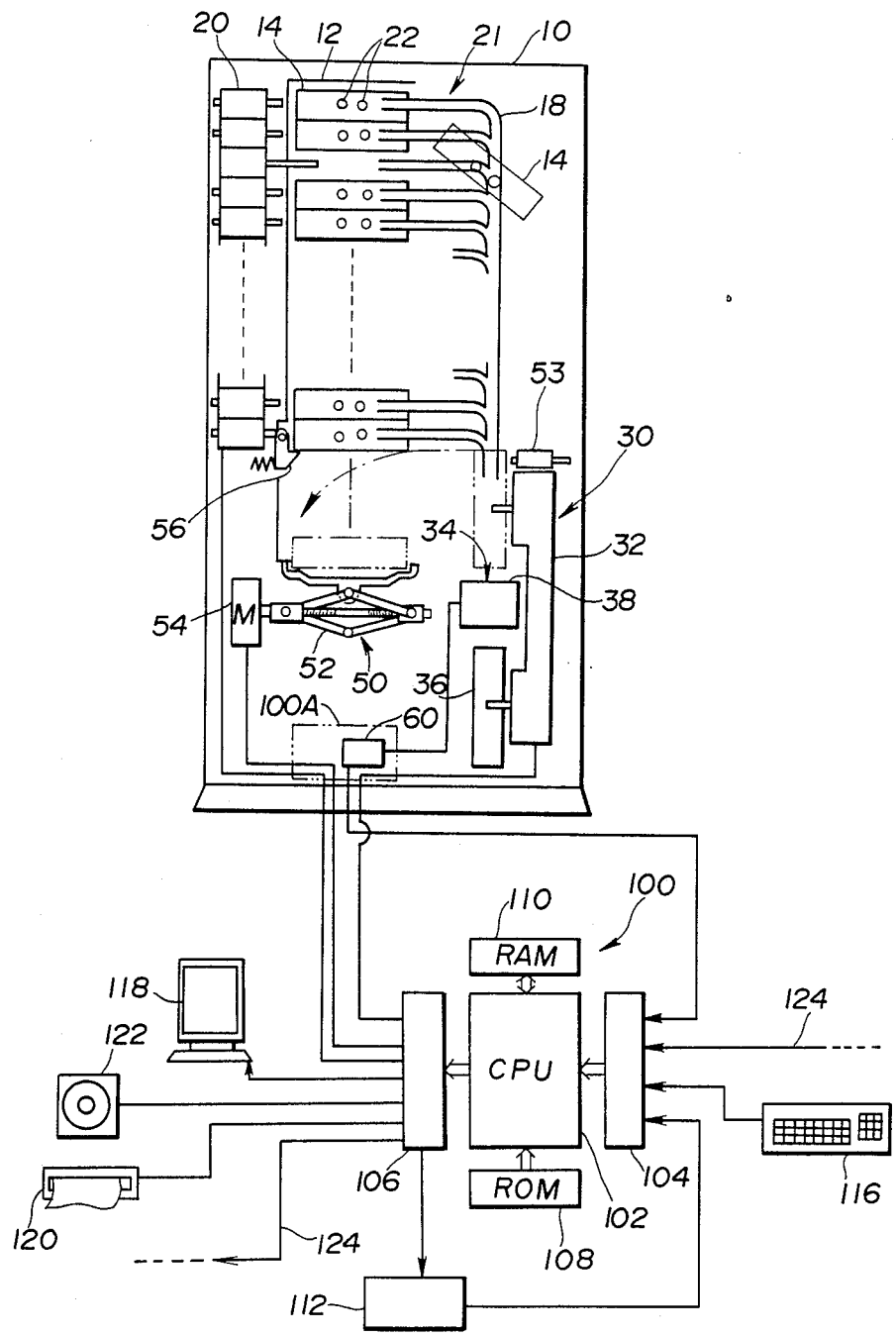
FIG. 5 is a schematic illustration showing a system with which a second embodiment of the invention is associated.

Second Embodiment;

Although it has been described that all operations are controlled by the control means 100, a separate control means 100A (shown by the dots-and-dash line in FIG. 5) constituted of a micro-processor or like means may be disposed in each casing 10, so that actuation of plungers 20 in the casing 10 and operation of scanner 30 are controlled by the control means 100A or image signal processing operations are carried out independently for respective casings. With such a construction, the control means 100 searches the cartridge 14 containing the target image, by referring to the data stored in the memory means 112, to identify the address information including the microfilm cartridge number and the image address. The address information is fed to the control means 100A disposed in each casing 10. Upon receipt of the address information, the control means 100A in the casing 10 actuates an appropriate plunger 20 to push out a designated microfilm cartridge 14 to the guide rails 18, 18 so that the cartridge 14 is transferred to the scanner 30 where the target image is read and the image signals are binarized and supplied to the control means 100. In this embodiment, the control means 100A includes an image signal processing circuit 60.

With one control means 100A for each casing 10 for controlling independently the operations taking place in each casing 10, it becomes easy to assemble an additional casing with an existing system to scale up the same.

FIG. 6(a) and (b) show a large scale system in which the embodiments of this invention are incorporated. In the illustrated system, eight casings 10 containing therein microfilm cartridge stacks $S_1$ to $S_n$ are movably placed on tracks 132 and connected to a plurality of work stations.

It will be appreciated that a large scale system may be easily installed, according to this invention, by only combining multiple casings 10 each containing stacks of microfilm cartridges with each other. The access time can be further decreased by controlling the operations in casings simultaneously in parallel. For example, in order to decrease the access time, when one cartridge 14 stored in one casing 10 is placed in the scanner 30 to read the target image, a next cartridge in another casing 10 is brought into the cavity 34 of the scanner 30 and operation for searching the target image is carried out.

Plural casings 10 may be located separately and connected with each other through a data communication network 124 so that the microfilm cartridges 14 contained therein may be utilized in response to the instructions from any work stations. It is also possible to utilize the same image in any one microfilm cartridge 14 simultaneously at different work stations.

Each casing 10 has a generally rectangular cross section and may be placed in any space, for example, near the walls or pillars in the room. The casing 10 may be placed even in a dead space near the ceiling of the room.

Although the framework 12 for containing stacks of microfilm cartridges has been described as a single unit, the framework 12 is not necessarily a single unit but may be divided into two or more smaller units which are installed in separate places and electrically connected together to control as a united system.

Third Embodiment;

A third embodiment will now be described with reference to FIGS. 7 and 8. In the third embodiment, a scanner is disposed above the framework and the cartridge is restored to the uppermost position of the cartridge stack after the completion of image reading operation.

Figure 7:
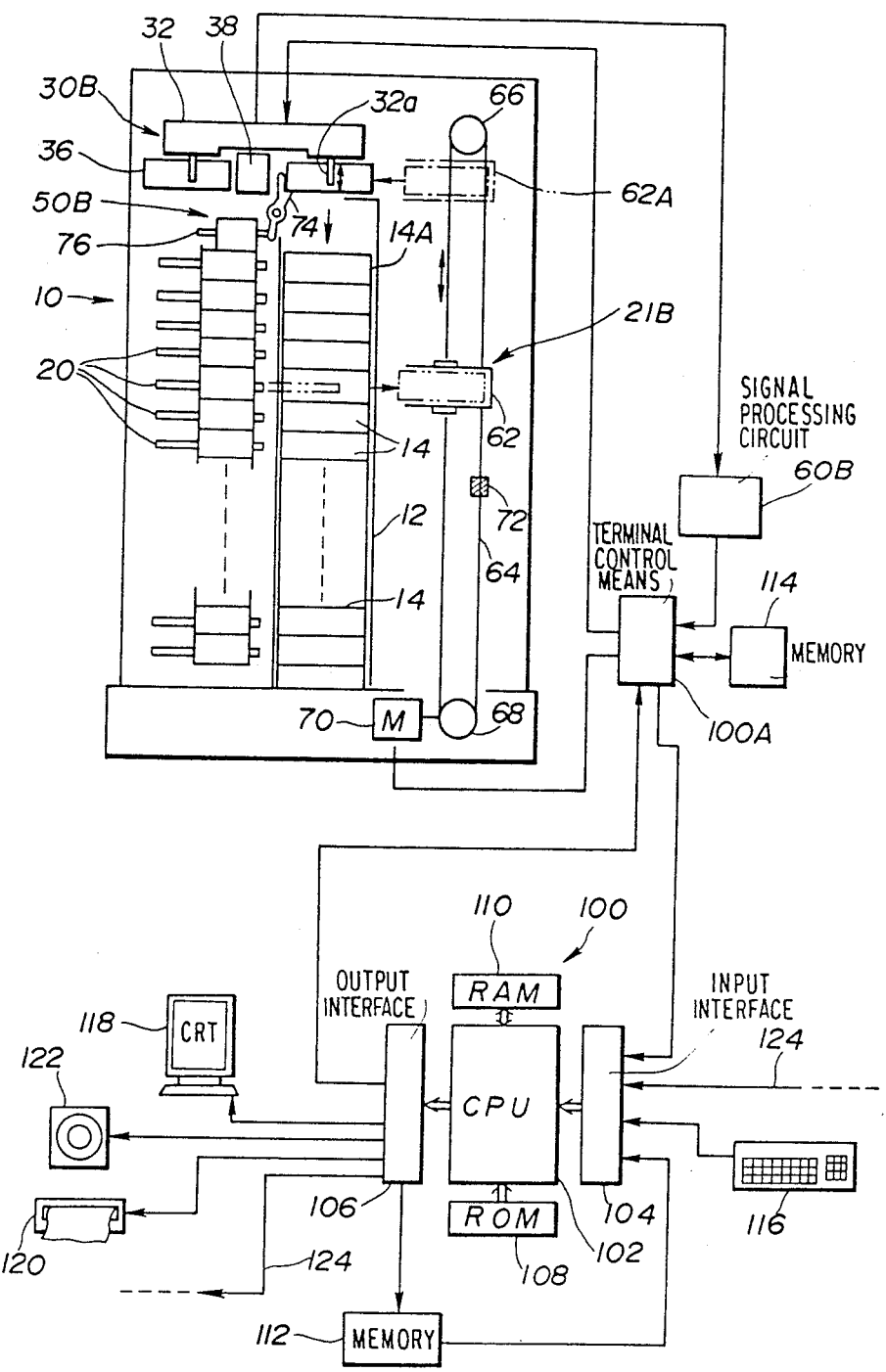
FIG. 7 is a schematic illustration showing a system with which a third embodiment of the invention is associated.
Figure 8:
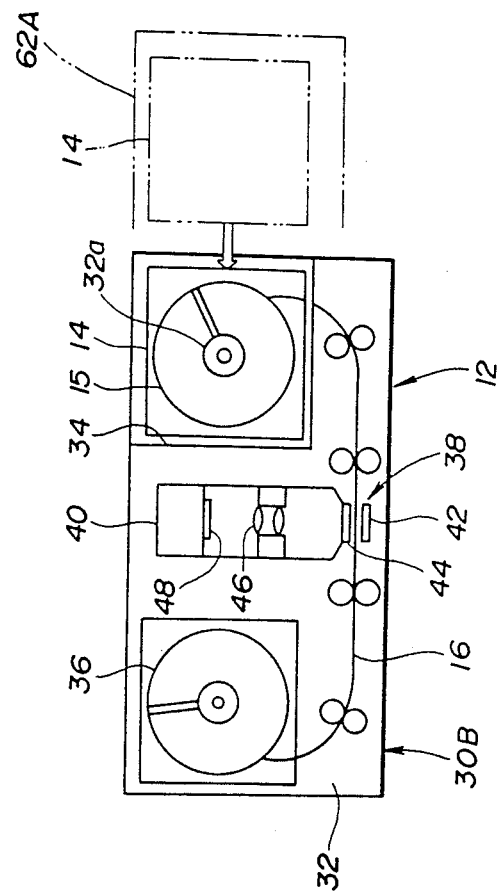
FIG. 8 is a plan view showing the scanner of the third embodiment which has received a selected microfilm cartridge.

FIG. 7 is a schematic illustration showing a system with which the third embodiment is associated, and FIG. 8 is a plan view showing the scanner of the third embodiment which has received a selected microfilm cartridge. In these Figures, the same members or parts as used in the first embodiment and shown in FIG. 1 are denoted by the same reference numerals and the description of such members will not be repeated for simplified description.

In the third embodiment, a scanner 30B is disposed above the framework 12.

Carrier means 21B used in this embodiment comprises an electromagnetic plunger 20B and a lift 62. In detail, plural electromagnetic plungers 20 are juxtaposed one above another along one side of the framework 12 while facing to respective cartridges 14, and a certain one of them projects in the horizontal direction to push out a selected cartridge 14. A lift 62 is movable in the vertical direction along one side of the framework 12 opposing to the side along which the plungers 20 are disposed, so that the lift 62 is moved to the position aligned with the, selected cartridge 14 to receive the cartridge 14 pushed out by the plunger 20. The lift 62 is suspended by a wire 64 to slide along guide tracks (not shown). The wire 64 is stretched between upper and lower pulleys 66, 68 and has its ends secured to the top and bottom faces of the lift 62. One of the pulleys, the pulley 68 in the illustrated embodiment, is rotated by a servo motor 70 so that the lift 62 is moved upwards or downwards. A counter weight 72 is fixedly secured to the wire 64 at a position gravitationally symmetrical with the lift 62 in order to decrease the load applied on the motor 70.

The scanner 30B disposed above the framework 12 has a driving unit 32 which in turn has a cavity 34 opened downwardly to receive the selected cartridge therein. On the other hand, the framework 12 has a top opening which opposes to the opening of the cavity 34 in the face-to-face relationship. The driving unit 32 has a reel drive shaft 32a extending downwards at the substantial center of the cavity 34 and being retractable, for example, in the upward direction. With such a construction, when the cartridge 14 carried by the lift 62 is to be moved into the cavity 34, the reel drive shaft 32a is retracted upwards so as not to hinder the operation of inserting the cartridge 14 into the cavity 34.

According to an important feature of this embodiment, after the cartridge 14 is handled by the scanner 30B to read any one or more images, it is delivered from the cavity 34 to the uppermost position in the framework 12.

The restoring means 50B comprises, for example, a pawl or clutch 74 which acts as a stopper for holding the cartridge 14 in situ in the cavity 34, and an electromagnetic plunger 76 for pivoting the clutch 74 to release the cartridge 14. Upon energization of the electromagnetic plunger 76, the clutch 74 is pivoted so that the cartridge 14 is released therefrom to fall downwards by the gravitational force to take the uppermost position of the cartridge stack contained in the framework 12 as denoted by 14A in FIG. 7.

The reels 15 and 36 are actuated with the selected cartridge 14 held in situ by the clutch 74 so that a target image is selected from the running film roll 16 to be read by the image reader 40. After the completion of image reading operation, the cartridge 14 is released from the clutch 74 which is pivoted upon energization of the electromagnetic plunger 74 to be placed at the uppermost position (14A in FIG. 7) of the cartridge stack.

The image signals a of the image read by the image sensor 48 are processed by the signal processing circuit 60B, and then put through the separate or terminal control means 100A to the center control means 100 where they are processed similarly as described with reference to the first and second embodiments.

Likewise in the first and second embodiments, address informations relating to respective cartridges 14 are stored in the memory 112 to cope with relocation of the cartridges 14. However, a memory 114 may be included in the terminal control means 100A so that the content and address of each cartridge 14 is stored in the memory 114.

Also, likewise in the first embodiment, a stand-by position 62A (see FIGS. 7 and 8) may be provided so that a next cartridge 14 is carried by the lift 62 to the stand-by position 62A adjacent to the cavity 34 while the preceeding cartridge 14 is handled by the scanner 30B.

As has been described hereinbefore, the present invention provides a microfilm searching and reading device wherein plural microfilm cartridges are stacked, one above another and a designated microfilm cartridge is taken out by carrier means to be delivered to and read by a scanner and then restored in the lowermost or uppermost position of the stack. The access time can thus be decreased remarkedly and the space required for installation of the device is reduced. Also one or more stand-by positions are provided so that the next cartridge and/or the cartridge subsequent to the next cartridge may be held at the stand-by positions during a certain cartridge is subjected to image reading operation, whereby the access time can be further decreased. Finally, the device of the invention has a further merit that the number of the casings may be freely increased or decreased to adapt readily for the change in scale of the overall system.

What is claimed is:

1. A microfilm searching and reading device for selectively taking out a cartridge containing a target image from one or more microfilm cartridge stacks, comprising:
    a framework defining at least one storing space extending substantially vertically for storing a stack of cartridges in a manner such that said cartridges are stacked one above another;
    a scanner for receiving a selected microfilm cartridge and having an image reader and a driving unit for winding and rewinding the microfilm, said scanner being disposed at a location below the underside of the lowermost cartridge;
    carrier means for taking out the selected cartridge and for guiding the same to said scanner;
    restoring means for putting the selected cartridge, after the target image has been read by said image reader, in the lowermost position of said storing space while pushing up said stack of cartridges;
    memory means for storing the location of the restored cartridge; and
    control means for controlling said carrier means, said scanner and said restoring means.

2. The microfilm searching and reading device as claimed in claim 1, wherein said carrier means comprises guide rails and means for taking out said selected cartridge.

3. The microfilm searching and reading device as claimed in claim 2, wherein said means for taking out said selected cartridge is an electromagnetic plunger.

4. The microfilm searching and reading device a claimed in claim 1, wherein one or more stand-by stations are provided along said guide rail.

5. The microfilm searching and reading device as claimed in claim 1, wherein said restoring means comprises a jack for receiving said cartridge from said scanner, after the target image has been read, and for moving said cartridge in the lowermost position of said stack.

6. The microfilm searching and reading device as claimed in claim 1, 2, 3, 4 or 5, wherein said framework defines a plurality of spaces each extending substantially vertically for receiving a stack of cartridges.

7. A microfilm searching and reading device for selectively taking out a cartridge containing a target image from one or more microfilm cartridge stacks, comprising:
    a framework defining at least one storing space extending substantially vertically for storing a stack of cartridges in a manner such that said cartridges are stacked one above another;
    a scanner for receiving a selected microfilm cartridge and having an image reader and a driving unit for winding and rewinding the microfilm, said scanner being disposed at a location overhanging said one or more microfilm cartridges;
    carrier means for taking out the selected cartridge and for guiding the same to said scanner;
    restoring means for putting the selected cartridge, after the target image has been read by said image reader, in the uppermost position of said storing space;
    memory means for storing the location of the restored cartridge; and
    control means for controlling said carrier means, said scanner and said restoring means.

8. The microfilm searching and reading device as claimed in claim 7, wherein said carrier means comprises a lift for carrying said cartridge to said scanner and push-out means for pushing out said cartridge from said storing space to said scanner.

9. The microfilm searching and reading device as claimed in claim 8, wherein said push-out means is an electromagnetic plunger.

10. The microfilm searching and reading device as claimed, in claim 8, wherein one stand-by station is provided in front of said scanner.

11. The microfilm searching and reading device as claimed in claim 7, wherein said restoring means comprises a stopper for holding said cartridge in position and means for pivoting said stopper so that said cartridge is released from said stopper to be moved downward by gravitational force.

* * * * *